Sept. 22, 1964  L. E. MAGERS  3,149,724
BOOKSTAND AND GLOBE ASSEMBLY
Filed March 23, 1961
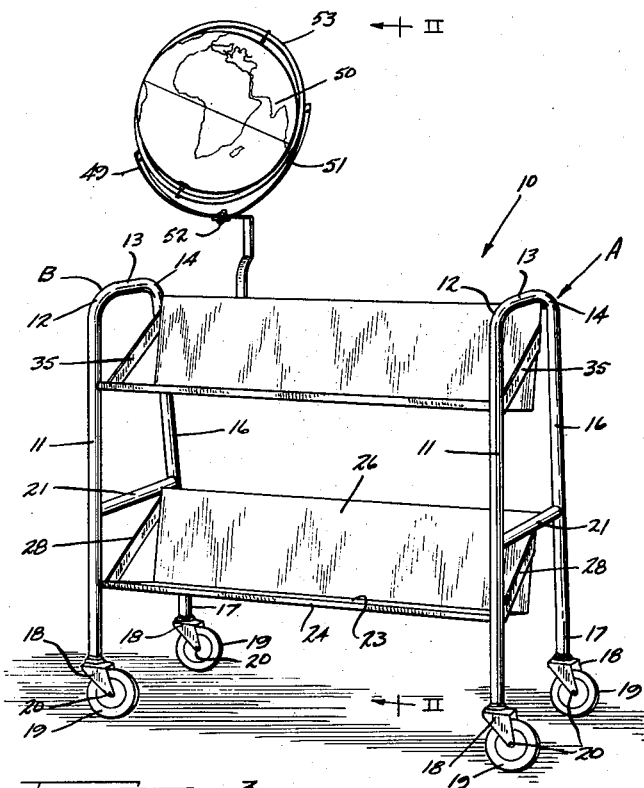
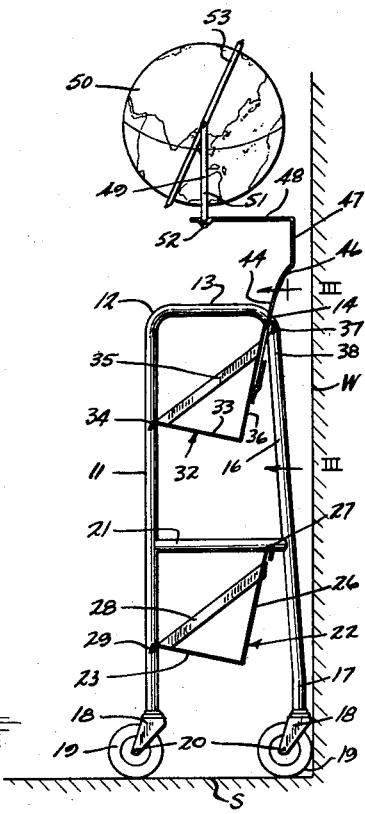
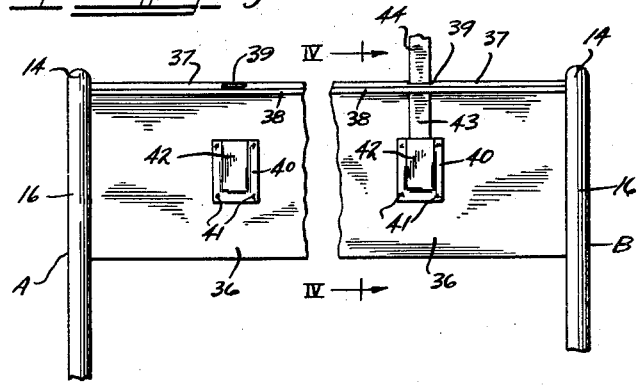
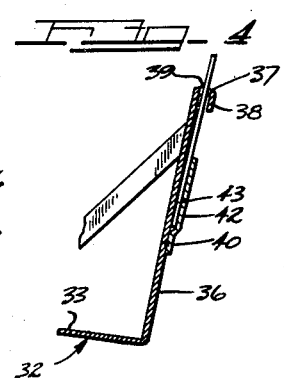
INVENTOR.
Lloyd E. Magers
BY
Hill, Sherman, Meroni, Gross & Simpson
ATTORNEYS United States Patent Office 3,149,724
Patented Sept. 22, 1964

3,149,724
BOOKSTAND AND GLOBE ASSEMBLY
Lloyd E. Magers, Evanston, Ill.; State Bank and Trust Company, Evanston, Ill., a corporation of Illinois, trustee and executor of said Lloyd E. Magers, deceased, assignor, by mesne assignments, to Gaylord Bros., Inc., Syracuse, N.Y., a corporation of New York
Filed Mar. 23, 1961, Ser. No. 97,967
7 Claims. (Cl. 211—42)

This invention relates generally to instructional devices and more particularly relates to a combined book and map holder of the type consisting of a wheeled bookstand formed with angled shelves and including a shelf back portion having an elongated support member carrying gimbals in which a map globe is suspended at approximately eye level superjacent the bookstand.

It is an object of the present invention to provide a mobile book and globe display stand wherein a globe-type map is advantageously displayed in association with global reference books and other complementary materials selected to improve instructional understanding.

Yet another object of the present invention is to provide an improved map globe supporting means.

Yet another object of the present invention is to provide a bookstand holding selected reference books at finger tip availability while carrying a map globe supported at eye level and in an accessible position for ready manipulation.

A still further object of the present invention is to provide a stand for supporting a map globe and for carrying books wherein the globe is protected from striking wall surfaces when the stand is moved adjacent thereto.

Many other features, advantages and additional objects of the present invention will become manifest to those versed in the art upon making reference to the detailed description which follows and the accompanying sheet of drawings in which a preferred embodiment of a combined book and map holder is shown by way of illustration of the principles of the present invention.

On the drawings:

FIGURE 1 is an elevational view of a combined book stand and map assembly embodying the principles of the present invention;

FIGURE 2 is a cross-sectional view taken on line II—II of FIGURE 1;

FIGURE 3 is a fragmentary cross-sectional view broken in part and somewhat enlarged in scale to illustrate additional details of the present invention; and FIGURE 4 is a fragmentary cross-sectional view taken on line IV—IV of FIGURE 3.

As shown on the drawings:

The combined bookstand and map assembly of the present invention is indicated generally at 10 and comprises two end frames shown at A and B. The end frames A and B are of identical construction except for being disposed in a right-hand and left-hand relation and, accordingly, like reference numerals have been applied to like parts.

Generally, each end frame A and B comprises an inverted U-shaped article. For example, a generally tubular member is shaped to form a front leg 11 disposed in a vertical plane. At the upper end of the front leg 11 there is a curved corner portion 12 forming a transition portion between the front leg 11 and a generally horizontally offset bight portion 13. The bight portion 13 extends into a curved transition portion 14. A rear leg 16 is angled generally downwardly and rearwardly and terminates in a vertically disposed portion as at 17 which is parallel to the front leg 11.

A caster is connected to the foot portion of the front leg 11 and the rear leg 16, each caster including a swivel bracket 18 formed in the usual bifurcated configuration to have a caster wheel 19 disposed therebetween and carried on a caster wheel axle 20. The caster wheels 19 rollably engage a support surface shown at S, thereby making the unit 10 mobile.

The angled relationship of the rear leg 16 with respect to the front leg 11 and the vertically disposed portion 17 affords a measure of safety against the unit 10 engaging against a wall surface such as the wall surface shown at W. In this regard, it will be noted that the caster wheel 19 on the rear leg 16 will form a bumper, thereby preventing the stand from engaging and possibly damaging the finished surface on the wall W.

Each end frame A and B has a cross piece 21, thereby to lend further rigidity to the frames.

One or more shelves may be extended between the end frames A and B. In the present embodiment two such shelves are provided. A lower shelf is shown generally at 22 and comprises a lower portion 23 having a front flange 24 and being connected at each end to a front leg 11 of a corresponding end frame A and B. The lower portion 23 angles downwardly and rearwardly, terminating in a back 26 which extends upwardly and rearwardly in a normal relation to the lower portion 23. The back 26 terminates in a reversely turned flange 27 and opposite ends thereof are connected in firm assembly to a corresponding cross piece of the end frames A and B. The ends of each shelf 22 may also be provided with reinforcing struts 28.

In accordance with the present invention, a second upper shelf is shown generally at 32 and comprises a lower portion 33 having a front flange 34 extending between the opposite front legs 11 of the end frames A and B and to which the shelf 32 is connected in firm assembly, for example, by brazing or the like.

The lower portion 33 of the shelf 32 angles rearwardly and downwardly terminating in a back 36 which extends in a normal direction relative to the lower portion 33, thereby angling upwardly and rearwardly. At the upper edge of the back 36 there is formed a flange offset as at 37, the flange 37 having a reversely turned lip 38 as is clearly shown in FIGURE 4.

The flange 37 is particularly characterized by the formation herein of one or more openings 39 formed in this instance in the form of a slot having its greater dimensional extent in a direction parallel to the back 36.

The shelf 32 may have end struts as shown at 35.

Below each opening or slot 39, there is formed a pocket on the rear side of the back 36 and in this particular embodiment, the pocket constitutes a sheet form member shaped to provide a peripheral flange 40 which may be fastened as at 41 to the back 36 and a central body portion 42 which is spaced from the back 36, thereby to form the pocket which opens in register with the opening 39.

In accordance with the principles of the present invention, an elongated support member has one end as at 43 which is received in the pocket 42 and extends parallel to the back 36. The support member has a straight body portion 44 which extends through the opening 39 and which is sized to be complementary thereto, thereby effecting a firm purchase with the shelf 32.

The body portion 44 is curved as at 46, whereupon there is formed a straight vertically disposed leg 47 forming a wall bumper slightly above and to the rear of the bight portion 13 on the end frames for protecting the map globe against engaging the surface of the wall W.

The vertical leg 47 terminates in a horizontally offset support leg 48. The support leg 48 near the end thereof carries gimbals 49 in which a globe-type map 50 is suspended.

Note particularly that the leg 48 extends into an area superjacent the shelf 32. The gimbals 49 include a first ring 51 fastened to the leg 48 as by means of fasteners 52 and a second ring 53.

The pockets 42 and the openings or slots 39 are spaced inwardly from the end frames A and B a sufficient distance so the end frames will also act to protect the globe 50 from engaging against a wall surface.

There is thus provided a book and globe display stand wherein global reference books and other materials are advantageously carried literally at the user's finger tips, while the globe is displayed at eye level and in a position for advantageous utilization by a user or a group of users.

Although various minor modifications might be suggested by those versed in the art, it should be understood that I wish to embody within the scope of this patent all such modifications as reasonably and properly come within the scope of my contribution to the art.

I claim as my invention:

1. A combined bookstand and map assembly comprising a pair of end frames each including a rear leg having a wheel-carrying foot portion and an upwardly extending portion offset relative to said foot portion to avoid contact with an adjoining wall surface, a shelf extending between said end frames and positioned forwardly of said rear legs, an elongated support member connected at one end to said shelf at a location between said end frames, a map globe connected to the other end of said support member, said support member including intermediate portions extending upwardly and rearwardly of said shelf to form a wall bumper to protect the globe from striking the wall.

2. A combined bookstand and map assembly comprising a pair of end frames each including a rear leg having a wheel-carrying foot portion and an upwardly extending portion offset relative to said foot portion to avoid contact with an adjoining wall surface, a shelf extending between said end frames and positioned forwardly of said rear legs, an elongated support member connected at one end to said shelf, a map globe connected to the other end of said support member, said support member including intermediate portions extending upwardly and rearwardly of said shelf to form a wall bumper to protect the globe from striking the wall, said support member being positioned between said end frame so that each end frame forms a wall bumper to protect the globe from striking an adjoining wall surface.

3. A combined bookstand and globe-support comprising a pair of end frames each comprising a generally inverted U-shaped member including a vertically disposed front leg and an angled rear leg, each leg having a castered foot portion, a shelf extending between said end frames including a lower portion angled to extend rearwardly and downwardly and a back portion angled to extend normal to said lower portion in an upward and rearward direction, and a globe means connected to said shelf comprising a map globe and a support carrier for said globe including a leg connected to said back portion of said shelf and a forwardly extending offset portion on said leg carrying said map globe superjacent said shelf.

4. A combined bookstand and globe support comprising a pair of end frames each comprising a generally U-shaped member including a vertically disposed front leg and an angled rear leg, each leg having a castered foot portion, a shelf extending between said end frames including a lower portion angled to extend rearwardly and downwardly and a back portion angled to extend normal to said lower portion in an upward and rearward direction, said back portion of said shelf having an upper edge offset rearwardly to form a flange, said flange having an opening formed therein, means forming a pocket on the rear side of said back portion of said shelf in register with said opening, an elongated support member having one end seated in said pocket and extending upwardly parallel to said back portion through said opening, said support member having a vertically extending intermediate portion forming a wall bumper, and a horizontally offset portion projecting forwardly into an area superjacent said shelf, and gimbals connected to said support member at said horizontal offset portion and a map globe carried in said gimbals.

5. A combined bookstand and globe support comprising a pair of end frames, casters on said end frames to render said frames mobile, a shelf extending between said end frames including a lower portion angled to extend rearwardly and downwardly and a back portion angled to extend normal to said lower portion in an upward and rearward direction, said back portion of said shelf having an upper edge offset rearwardly to form a flange, said flange having at least one opening formed therein, means forming at least one pocket on the rear side of said back portion of said shelf, said pocket being in register with said opening, and an elongated support member having one end seated in said pocket and extending upwardly parallel to said back portion through said opening, said support member having a forwardly projecting horizontally offset portion, gimbals connected to said offset portion, and a map globe carried in said gimbals superjacent said shelf.

6. A combined bookstand and globe support comprising a pair of end frames, casters on said end frames to render said frames mobile, a shelf extending between said end frames including a lower portion angled to extend rearwardly and downwardly and a back portion angled to extend normal to said lower portion in an upward and rearward direction, said back portion of said shelf having an upper edge offset rearwardly to form a flange, said flange having at least one opening formed therein, means forming at least one pocket on the rear side of said back portion of said shelf, said pocket being in register with said opening, and an elongated support member having one end seated in said pocket and extending upwardly parallel to said back portion through said opening, said support member having a forwardly projecting horizontally offset portion, gimbals connected to said offset portion, and a map globe carried in said gimbals superjacent said shelf, said support member having a vertically extending intermediate portion forming a wall bumper thereby to protect the globe from striking an adjoining wall surface.

7. A combined bookstand and globe support comprising a pair of end frames, casters on said end frames to render said frames mobile, a shelf extending between said end frames including a lower portion angled to extend rearwardly and downwardly and a back portion angled to extend normal to said lower portion in an upward and rearward direction, said back portion of said shelf having an upper edge offset rearwardly to form a flange, said flange having at least one opening formed therein, means forming at least one pocket on the rear side of said back portion of said shelf, said pocket being in register with said opening, and an elongated support member having one end seated in said pocket and extending upwardly parallel to said back portion through said opening, said support member having a forwardly projecting horizontally offset portion, gimbals connected to said offset portion, and a map globe carried in said gimbals superjacent said shelf, said support member having a vertically extending intermediate portion forming a wall bumper thereby to protect the globe from striking an adjoining wall surface, there being two of said pockets each spaced sufficiently inwardly of a corresponding end frame to protect the globe from striking an adjoining wall surface.

References Cited in the file of this patent

UNITED STATES PATENTS

| | | |
|---|---|---|
| 214,721 | Smith | Apr. 22, 1879 |
| 600,234 | Parr | Mar. 8, 1898 |
| 664,922 | Bening | Jan. 1, 1901 |
| 1,561,156 | Greedy | Nov. 10, 1925 |
| 2,349,515 | Oberst | May 23, 1944 |
| 2,958,959 | Hubbard | Nov. 8, 1960 |

FOREIGN PATENTS

| | | |
|---|---|---|
| 526,776 | Italy | May 21, 1955 |